US012646010B2

(12) United States Patent
Amiri Moghadam et al.

(10) Patent No.: US 12,646,010 B2
(45) Date of Patent: Jun. 2, 2026

(54) SYSTEMS AND METHODS FOR LEVERAGING A KNOWLEDGE GRAPH

(71) Applicant: JPMORGAN CHASE BANK, N.A., New York, NY (US)

(72) Inventors: Sadra Amiri Moghadam, Mission San Jose, CA (US); Reza Momenifar, New York, NY (US); Gupta Gundlapalli, New York, NY (US); Janelle Ghanem, New York, NY (US); Wanying Ding, Sunnyvale, CA (US); Anagha Rumade, New York, NY (US); Javier Ortiz, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 763 days.

(21) Appl. No.: 18/063,671

(22) Filed: Dec. 8, 2022

(65) Prior Publication Data

US 2024/0193488 A1     Jun. 13, 2024

(51) Int. Cl.
*G06N 20/20*          (2019.01)

(52) U.S. Cl.
CPC .................................... *G06N 20/20* (2019.01)

(58) Field of Classification Search
CPC .......... G06N 20/00; G06N 20/20; G06N 5/02
See application file for complete search history.

(56) References Cited

U.S. PATENT DOCUMENTS

| | | | | |
|---|---|---|---|---|
| 11,442,963 | B1 * | 9/2022 | Lecue ................... | G06F 16/906 |
| 2022/0044767 | A1 * | 2/2022 | Rong ................... | G06F 18/241 |
| 2022/0382770 | A1 * | 12/2022 | Zhang ................... | G06N 20/00 |
| 2024/0144337 | A1 * | 5/2024 | Fox ................... | G06Q 30/0623 |

OTHER PUBLICATIONS

Xuan et al, "Gradient Boosting Decision Tree-Based Method for Predicting Interactions Between Target Genes and Drugs", 2019, Frontiers in Genetics, Section Computational Genomics, pp. 1-11. (Year: 2019).*

* cited by examiner

*Primary Examiner* — Alexey Shmatov
*Assistant Examiner* — Clint Mullianx
(74) *Attorney, Agent, or Firm* — GREENBERG TRAURIG LLP

(57) ABSTRACT

In some aspects, the techniques described herein relate to a method including: embedding a graph with an embedding model, wherein the embedding generates node and edge vectors for each node and each edge, respectively, in the graph; generating peer node groups based on the node vectors and the edge vectors; generating edge predictions based on the node vectors and the edge vectors; training a machine learning model based on the node vectors and the edge vectors; inputting the node vectors and the edge vectors into the machine learning model; receiving, as output from the machine learning model, a prediction of a future action based on the node vectors and the edge vectors; generating a plurality of insights based on the peer node groups, the edge predictions, and the prediction of a future action; storing the plurality of insights in an insight database, and providing an interface to the insight database.

6 Claims, 4 Drawing Sheets

SYSTEMS AND METHODS FOR LEVERAGING A KNOWLEDGE GRAPH

BACKGROUND

1. Field of the Invention

Aspects generally relate to systems and methods for leveraging a knowledge graph.

2. Description of the Related Art

Knowledge graphs are helpful for determining and analyzing relationships between various types of entities. An exemplary relationship that can be examined using a bipartite knowledge graph exists between startup companies (target companies) and venture capital investment companies (VCs). Startup companies seek capital injections in order to facilitate growth before they are able to reinvest profits. Venture capital companies seek targets in which to invest capital. But pairing a VC with a suitable target (and vice versa) is challenging because of limitations on human networks and communication. This is just one area where graph structured data can be leveraged.

Entities, such as VCs and target companies, can be arranged as a robust set of bipartite nodes and an initial set of edges arranged in a graph structure. Modeling techniques, however, are still required in order to build a knowledge graph efficiently and accurately and generate accurate predictions based on thereon.

SUMMARY

In some aspects, the techniques described herein relate to a method including: embedding a graph with an embedding model, wherein the embedding generates node vectors and edge vectors for each node and each edge, respectively, in the graph; generating peer node groups based on the node vectors and the edge vectors; generating edge predictions based on the node vectors and the edge vectors, wherein the edge predictions are further based on a distance between a head node and a tail node; training a machine learning model based on the node vectors and the edge vectors; inputting the node vectors and the edge vectors into the machine learning model; receiving, as output from the machine learning model, a prediction of a future action based on the node vectors and the edge vectors; generating a plurality of insights based on the peer node groups, the edge predictions, and the prediction of a future action; and storing the plurality of insights in an insight database.

In some aspects, the techniques described herein relate to a method, wherein the machine learning model is a gradient-boosted decision tree model.

In some aspects, the techniques described herein relate to a method, wherein the peer node groups are based on inclusion in a predefined vector space.

In some aspects, the techniques described herein relate to a method, including: performing dynamic embedding of the graph, including periodic embedding of historical graphs generated over predefined time periods.

In some aspects, the techniques described herein relate to a method, including: exposing node and edge attributes to the machine learning model, wherein the prediction of the future action is further based on the node and edge attributes.

In some aspects, the techniques described herein relate to a method, wherein the graph data is stored in a graph database.

In some aspects, the techniques described herein relate to a method, including: providing a user application, wherein the user application includes an interface to the graph database and an interface to the insight database.

In some aspects, the techniques described herein relate to a system including at least one computer wherein the at least one computer includes a processor, and wherein the at least one computer is configured to: embed a graph with an embedding model, wherein the embedding generates node vectors and edge vectors for each node and each edge, respectively, in the graph; generate peer node groups based on the node vectors and the edge vectors; generate edge predictions based on the node vectors and the edge vectors, wherein the edge predictions are further based on a distance between a head node and a tail node; train a machine learning model based on the node vectors and the edge vectors; input the node vectors and the edge vectors into the machine learning model; receive, as output from the machine learning model, a prediction of a future action based on the node vectors and the edge vectors; generate a plurality of insights based on the peer node groups, the edge predictions, and the prediction of a future action; and store the plurality of insights in an insight database.

In some aspects, the techniques described herein relate to a system, wherein the machine learning model is a gradient-boosted decision tree model.

In some aspects, the techniques described herein relate to a system, wherein the peer node groups are based on inclusion in a predefined vector space.

In some aspects, the techniques described herein relate to a system, wherein the at least one computer is configured to perform dynamic embedding of the graph, including periodic embedding of historical graphs generated over predefined time periods.

In some aspects, the techniques described herein relate to a system, wherein the at least one computer is configured to expose node and edge attributes to the machine learning model, wherein the prediction of the future action is further based on the node and edge attributes.

In some aspects, the techniques described herein relate to a system, wherein the graph data is stored in a graph database.

In some aspects, the techniques described herein relate to a system, wherein the at least one computer is configured to provide a user application, wherein the user application includes an interface to the graph database and an interface to the insight database.

In some aspects, the techniques described herein relate to a non-transitory computer readable storage medium, including instructions stored thereon, which instructions, when read and executed by one or more computer processors, cause the one or more computer processors to perform steps including: embedding a graph with an embedding model, wherein the embedding generates node vectors and edge vectors for each node and each edge, respectively, in the graph; generating peer node groups based on the node vectors and the edge vectors; generating edge predictions based on the node vectors and the edge vectors, wherein the edge predictions are further based on a distance between a head node and a tail node; training a machine learning model based on the node vectors and the edge vectors; inputting the node vectors and the edge vectors into the machine learning model; receiving, as output from the machine learning model, a prediction of a future action based on the node vectors and the edge vectors; generating a plurality of insights based on the peer node groups, the edge predictions, and the prediction of a future action; and storing the plurality of insights in an insight database.

In some aspects, the techniques described herein relate to a non-transitory computer readable storage medium, wherein the machine learning model is a gradient-boosted decision tree model.

In some aspects, the techniques described herein relate to a non-transitory computer readable storage medium, wherein the peer node groups are based on inclusion in a predefined vector space.

In some aspects, the techniques described herein relate to a non-transitory computer readable storage medium, including: performing dynamic embedding of the graph, including periodic embedding of historical graphs generated over predefined time periods.

In some aspects, the techniques described herein relate to a non-transitory computer readable storage medium, including: exposing node and edge attributes to the machine learning model, wherein the prediction of the future action is further based on the node and edge attributes.

In some aspects, the techniques described herein relate to a non-transitory computer readable storage medium, wherein the graph data is stored in a graph database, wherein the at least one computer is configured to provide a user application, and wherein the user application includes an interface to the graph database and an interface to the insight database.

DETAILED DESCRIPTION

Figure 1:
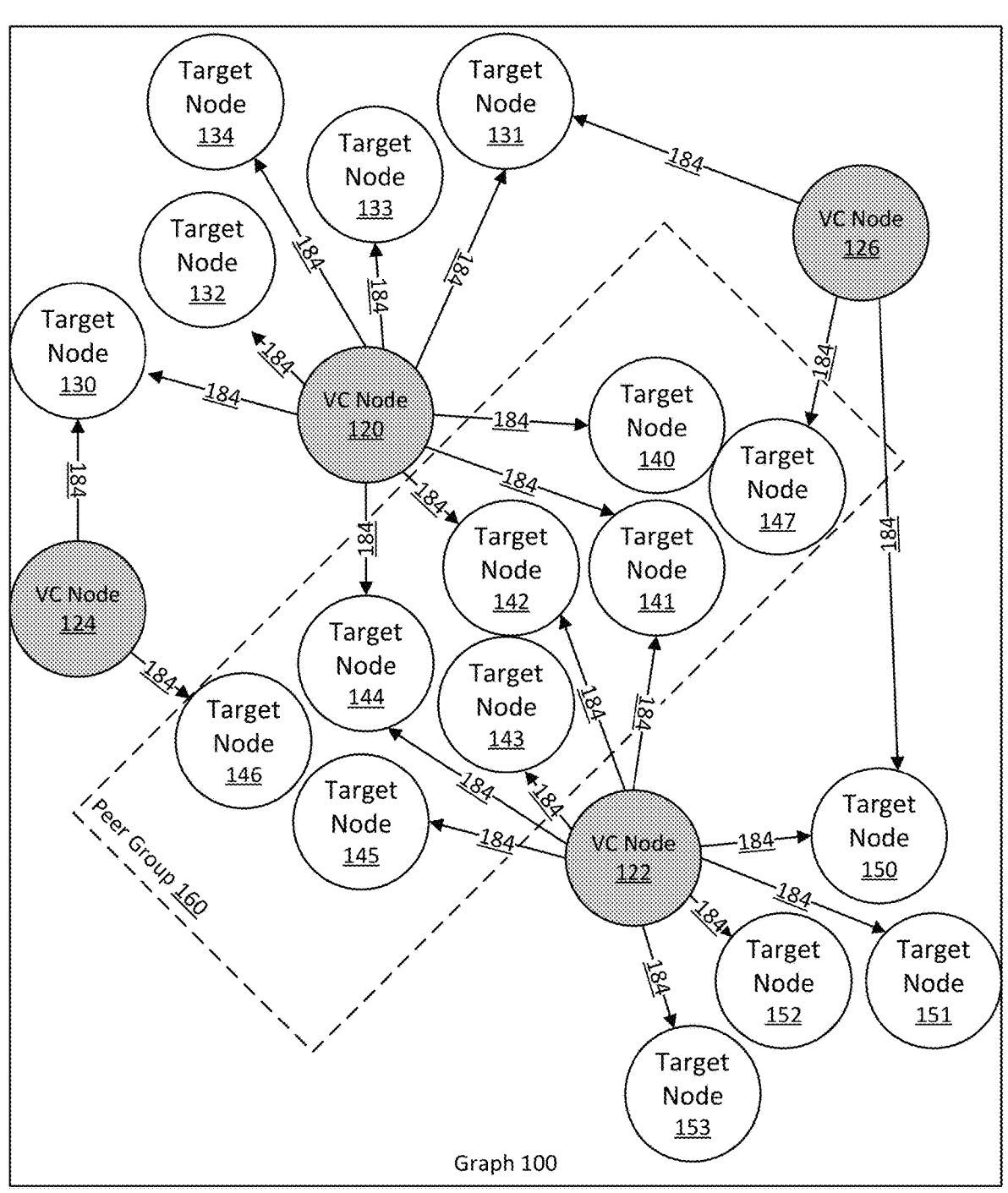
FIG. 1 is a block diagram of a graph, in accordance with aspects.

Aspects are directed to systems and methods for leveraging a knowledge graph.

In accordance with aspects, where a particular relationship exists between two types of entities, a knowledge graph can be built and leveraged in order to analyze relationships between the entities and make predictions with respect to the relationships between the entities. Venture capital companies (VCs or VC nodes) and startup companies (target companies, targets, or target nodes) are used herein as exemplary node types in order to help illustrate the disclosed techniques. But the techniques described herein can be used generally with graph structure data, and the particular examples should not be viewed as limiting. Further, while aspects are described in the context of a bipartite graph, techniques described herein are applicable to knowledge graphs, generally.

In accordance with aspects, data with respect to two types of entities that can be related with a defined relationship can be structured as a graph. The graph may be a bipartite graph in that it may consist of two types of nodes connected with directed edges. For instance, a bipartite graph may include VC nodes that represent a venture capital investment company and target nodes that represent a startup company that a venture capital company has invested in. Graph edges, or relationships, may be directional from a first type of node to a second type of node, and may be of similar type. For instance, nodes may be connected with "INVESTED_IN" edges. The edges may be directed from the VC nodes to the target nodes indicating that a given VC has invested in a particular target.

Node and edge data may be formatted in a standardized graph format. A standardized graph format is useful for building and exchanging graph structure data, and for modelling the graph structure data. A graph format may be XML-based, hierarchical text-based, etc. A graph format may provide the ability to specify node elements, node attributes (such as a node identifier (ID), and other attributes), edges, edge attributes (such as a source node and a target node), whether edges are directed or undirected, etc. The term "graph," as used herein, refers to data formatted in a graph structure.

Beyond a node ID, exemplary attributes of a VC company represented as a graph node may include attributes such as investment market, sources of investment capital, board members, a total amount of capital invested, and other descriptive attributes. Target companies represented as graph nodes may include attributes such as financials, market, latest investment round, investors, board members, etc.

In accordance with aspects, graph embedding may be used in order to determine similar nodes in a graph. In an exemplary environment using VC and target nodes, graph embedding can be used as a technique to identify peer nodes. Graph embedding can be used as a substitute for, or in addition to, conventional techniques that rely heavily on nodes' attributes to identify peers. Graph embedding can avoid inaccuracies in peer groupings that are associated with inaccurate or missing attributes, where the groupings are based on node attributes. Moreover, peer nodes may not necessarily share the same attributes. For example, given an industrial domain attribute for an organization that is quantified with a North American Industry Classification System (NAICS) code, two retailers may have different NAICS codes. Accordingly, while the two retailers may be closely related, a peer grouping based heavily on node attributes may produce inaccurate results, given dissimilar NAICS codes. Another example of related nodes having dissimilar attributes that may lead to inaccuracies in attribute-based peer grouping techniques includes retailers that differ significantly in annual revenue. For example, a high-revenue retailer may still be considered a peer to mid-revenue or low-revenue retailers, but attribute-based peer grouping techniques may not group entities based on revenue differences.

In accordance with aspects, peer nodes are predicted based on the nodes' positions in the graph. Node type and edge direction can be ignored for this goal of finding peer nodes. Graph ML techniques transform graph nodes to a set of vectors—i.e., node embeddings. Random walks may be used to create node embeddings. A random sampling of several random walks starting from various nodes can be taken. Further, the nodes that show up closer to each other in these random walks will be closer to each other in the graph and this "close" relationship is translated into the embedding space. Thus, nodes closer to each other in embedding space can be called similar.

In accordance with aspects, an exemplary embedding process may take a random sample of 20 random walks from each node in the graph, where each random walk length is 20. Each node in the graph may be processed by the embedding technique to be transformed into a numeric vector. Similarity measurements may be applied over the embeddings to determine which nodes are peers. A similarity score may indicate a relative similarity between two nodes. For instance, a cosine similarity score may be applied over the embeddings to determine peer nodes. A relatively higher score indicates a relatively higher similarity between two nodes, whereas a relatively lower score indicates a relatively lower similarity between two nodes. In some aspects, a similarity threshold score may be established where any nodes having a similarity score above an established threshold are treated as peers.

In accordance with aspects, graph embedding models determine the geometry of an embedding space in such a way that it roughly captures the relationships of the graph which means nodes that are closely connected to each other in the graph would also be closer to each other in the embedding space. This means that peer nodes would be close to a node in the embedding space. Graph embedding may leverage the many relationships between nodes in a graph to determine an embedding space. Nodes having a similar position in a graph may be referred to as having a similar "context." A notable advantage of determining peer node groups with graph embedding models is that some of the nodes that are possibly peers of each other may not have any edges connecting them explicitly. These nodes' similarity is a result of their similar context in the graph, which means they share a relatively high number of random walks with their peers in the graph. For instance, a peer node that is not directly connected with a node for which peers are being found but is present in the same vicinity (i.e., the same peer group space) as the node for which peers are being found may be predicted to be a candidate to be connected with nodes that its peers are related to, but that it is not directly related to. A graph query to find peers may not return a node which is not directly connected or which is more than one hop away. Accordingly, graph embedding offers advantages over graph queries that may rely to a greater extent on the relationships in the graph along with the node attributes for identifying peer nodes.

Accurate peer recommendations may be useful for many practical applications. For instance, in an exemplary bipartite graph with VC nodes and target nodes, a company may wish to raise more capital and in such a case, a similar company may be found using the peers method above and the VC nodes investing in the similar company may also be interested in investing into the target company and the same logic can be applied to investors looking to expand their portfolios.

FIG. 1 is a block diagram of a bipartite graph, in accordance with aspects. While FIG. 1 depicts VC nodes and target nodes, these node types are exemplary, and not meant to be limiting. Moreover, while FIG. 1 depicts a bipartite graph, the techniques described with respect to FIG. 1, and herein, generally, may be applied to different types of graphs, and the bipartite graph of FIG. 1 should not be construed as limiting. FIG. 1 includes graph 100, which includes VC node 120, VC node 122, VC node 124 and VC node 126. Graph 100 further includes target nodes 130-134, target nodes 140-147, and target nodes 150-153. In graph 100, VC nodes are related to target nodes with INVESTED_IN edge 184. INVESTED_IN edge 184 is a directional edge that is directed from a VC node to a target node. Peer group 160 is depicted as a dashed enclosure around target nodes 140-145 and indicates that target nodes 140-147 have been identified as peers based on node embedding models using techniques as discussed herein.

In accordance with aspects, node embedding techniques, as discussed above, may be performed on graph 100, and may determine that target nodes 140-147 are peers as shown by inclusion in peer group 160. As depicted in graph 100, members of peer group 160 are, visually, close to one another on the graph (i.e., these nodes are "neighbors" on the graph). Likewise, the node embedding techniques described above may mathematically find target nodes 140-147 to be peers of each other. Graph embedding models may find that the target nodes 146 and 147 are peers, even though target node 146 and target node 147 do not have a VC node in common. This indicates that graph embedding models may determine target node 146 and target node 147 as peers based on the fact that they show up close to each other in a relatively high number of random walks and are closer to each other in the defined vector space.

In accordance with aspects, graph 100 may be drawn as depicted in FIG. 1 to visually represent the node peer groupings by a graphics engine and displayed via a graphical user interface (GUI) of a graph viewing application, so that users of the graph viewing application may easily visualize peer group 160.

In accordance with aspects, in addition to peer group predictions, a graph may be utilized to predict relationships between two nodes, where no relationship currently exists. In an exemplary bipartite graph, such a prediction may be used, e.g., to predict that a particular VC represented on the graph may be interested in investing in a particular target company that is also represented on the graph. Aspects may use numeric vectors generated from graph nodes by graph embedding techniques in order to predict potential new relationships on a graph, yet the fundamental modeling technique for predicting edges may be different that that used for predicting peer groups.

In accordance with embodiments, a link prediction model (i.e., a model for predicting edges, links or relationships in a knowledge graph) may utilize vectors produced during graph embedding. Unlike peer group prediction techniques, however, an edge prediction model may assume that a header node (i.e., a node from which a relationship starts) embedding plus an edge embedding of an edge starting at the header node, equals a tail node (i.e., a node to which the edge runs or is directed) embedding. In an exemplary graph, a head node be a VC node, while a tail node may be a target node. An edge may be an INVESTED_IN relationship, and the edge direction may be from the VC node to the tail node. A link prediction model may take into account different node types and edges and their direction. An exemplary formula used in an edge prediction model may be (r=distance (t, h)), where "r" is the predicted link, "t" is the tail node, and "h" is the head node. Using this formula, an edge may be predicted based on the distance between a header node and a tail node.

In accordance with aspects, a form of dynamic graph embedding may be used in order to facilitate accurate predictions about graph data based on historical graph data. A graph may include multiple versions of data that comprise the graph. That is, a graph may include graph versions from a number of historical time periods. For instance, a graph may include graph versions from each or 4 preceding quarter-year time periods, graph versions from 12 preceding monthly time periods, or various other numbers of various other time periods. A graph that reflects data from a particular historical time period is referred to herein as a "historical graph." A graph that includes historical graphs in its composition is referred to herein as a "complete graph," or simply as a "graph." A graph may comprise multiple historical graphs from various historical time periods, and historical graphs of additional time periods may be added to a graph (e.g., a new historical graph may be added to a graph for a latest completed time period, whether it be a month, a quarter-year, etc.).

In order to have a model consider historical data of historical graphs, a graph may use a form of dynamic embedding when training a model that will make predictions based on a complete graph. For instance, a graph may initially comprise a single historical graph, and the graph may be embedded using a graph embedding model according to the techniques described above. As historical graphs are added to the graph, additional graph embedding may be initialized with the parameters from the previous embedding and tuned with the newly added data of the most recently added historical graph. Nodes that do not appear in the graph prior to addition of the most historical graph (i.e., nodes that are only present in the most recent historical graph added to the graph) may be initialized randomly. In this way the graph can "remember" historical data from historical graphs and take historical graphs into consideration when making predictions. A most-recent embedding process can include all nodes from every historical graph added to the graph. Node embeddings (e.g., node vectors) from the graph may be combined with node attributes and may be used as input to a machine learning model where the model outputs predictions based on the complete graph.

In accordance with aspects, a machine learning (ML) model may be used for predicting labels associated with a complete graph. Exemplary models for making predictions based on graph data include decision tree models such as gradient-boosted decision tree models and random forest decision tree models, linear regression models, neural network models, etc. A suitable machine learning model may be trained on each version of a graph, and may be used to make predictions about a latest version of a graph. The machine learning model may take both the vectors from a graph embedding model and node and edge attributes from the graph as input in order to generate predictions based on the input.

In an exemplary aspect, a graph including VC nodes, target nodes and INVESTED_IN edges may be processed using graph embedding models, and the node vectors produced by the embedding model may be used as input to a ML model, along with attributes from the graph. The ML model may be configured to predict which target nodes will receive VC funding in a given timeframe (e.g., which target nodes are likely to receive funding in the next 6 months.

Figure 2:
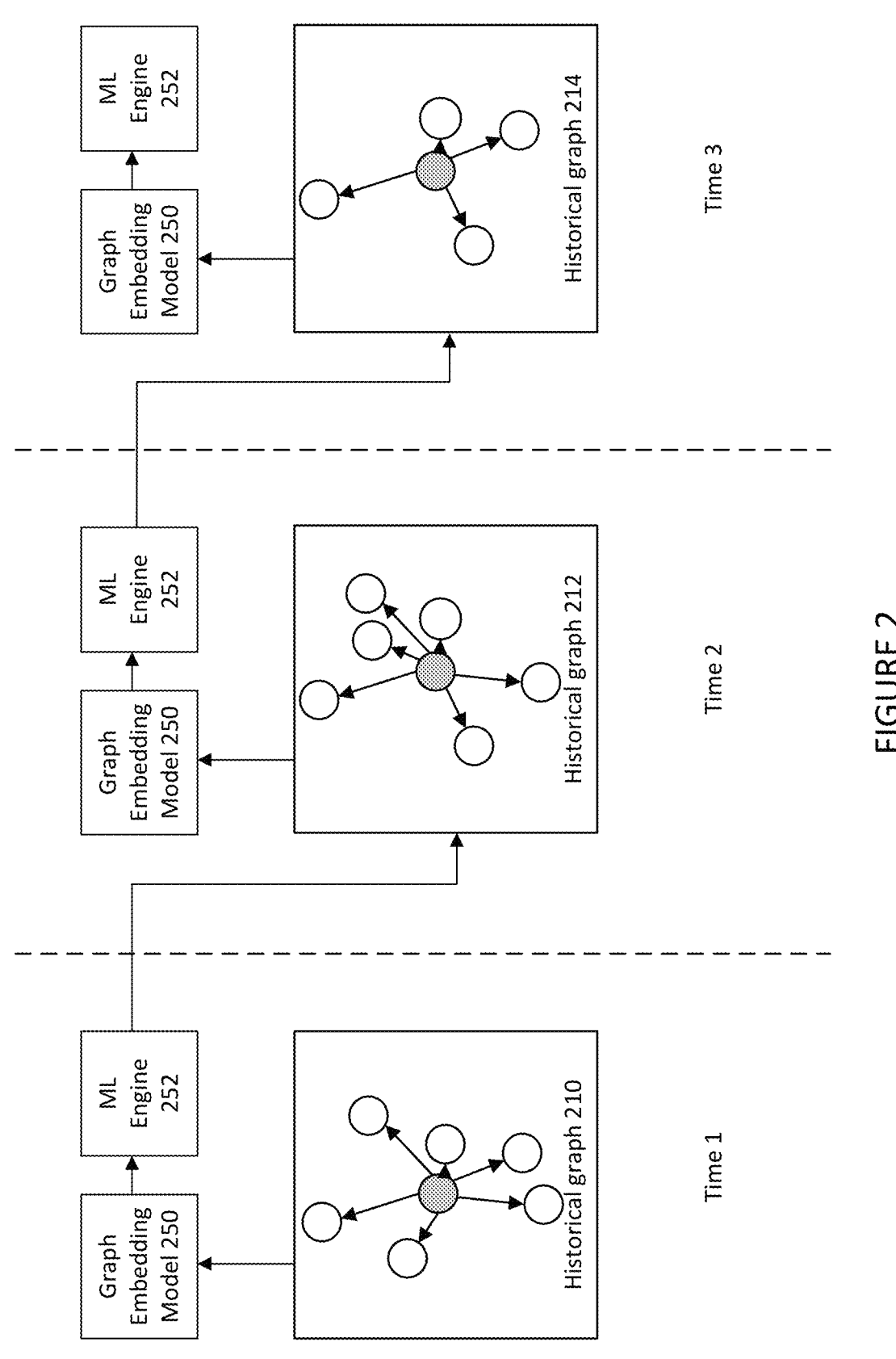
FIG. 2 is a block diagram showing dynamic graph embedding, in accordance with aspects.

FIG. 2 is a block diagram showing dynamic graph embedding, in accordance with aspects. Depicted in FIG. 2 is historical graph 210, historical graph 212, and historical graph 214. Additionally depicted is graph embedding model 250 and ML engine 252. Historical graph 210, historical graph 212, and historical graph 214, are historical graphs from past time periods. For instance, in an exemplary aspect, historical graph 210 may be a historical graph from the first quarter of a particular calendar year, and historical graph 212 may be a historical graph from the second quarter of the particular calendar year, while historical graph 214 may be from the third quarter if the particular year. Historical graph 210 may be an initial version of a graph, while historical graph 212 may be an updated version of the initial version. That is, historical graph 212 may include all the data in historical graph 210 plus additional data collected and added to the graph in another time period beyond the time period associated with historical graph 210 (e.g., data collected and added in the second quarter of a given year). Likewise with historical graph 214.

Graph embedding model 250 represents a graph embedding model engine that interfaces with graph structured data and embeds graph structured data using the techniques described herein. ML engine 252 represents a machine learning engine that includes one or more machine learning models. ML engine 252 may also interface with graph structured data and may be configured to perform operations such as training of the included machine learning models and/or receiving data as input and generating predictions with respect to relationships among the received data based on patterns discovered in the received data. ML engine 252 may receive vectorized node data from graph embedding model 250 for training and prediction operations. ML engine 252 may also receive other vectorized or non-vectorized data from graph embedding model 250, directly from a graph, or via some other pre-processing operation (e.g., vectorized or non-vectorized node or edge attribute data). Exemplary ML models that may be executed by ML engine 252 include decision tree models such as gradient-boosted decision tree models and random forest decision tree models, linear regression models, neural network models (e.g., graph neural network (GNN) models), etc.

Historical graph 210 may be the first graph to be analyzed. After the close of time 1 (e.g., at the end of the first quarter of a particular year), historical graph 210 can be processed with graph embedding model 250 to produce node and edge vectors associated with each node in historical graph 210. Also at time 1, ML engine 252 may receive the edge and node vectors for training a machine learning algorithm included in ML engine 252. Node embeddings from time 1 may be used to determine peers of nodes in historical graph 210 and may be further used to predict additional edge relationships in the graph based on distance between a header node and a tail node, as discussed above. Additionally, the vectors from graph embedding model 250 may be used as input to ML engine 252 for a prediction operation, and ML engine 252 may output predictions about the input data. The predicted peer group data, predicted edge data, and any predictions from ML engine 252 may be organized and displayed via a user interface to allow users of the graph access to the model predictions such that the predictions may be used as actionable information to the graph users.

With continued reference to FIG. 2, starting after the close of time 1, and at the beginning of time 2, any new data relevant to the graph may be included in the graph. For instance, new nodes may be included, new edges may be included, and new attributes may be included or updated. This updating of the graph data may continue throughout time (period) 2 and may stop at the end of time period 2. After the passing of the second time period, and at time 2, the modeling process as described above with respect to time 1 is carried out again. That is, after the close of a second time period, and at time 2, the updated graph (i.e., historical graph 212) may be embedded by graph embedding model 250, models in ML engine 252 may be trained on the new vector data, and peer groupings, additional edges, and particular predictions may be generated, as discussed above. This process may likewise be repeated for historical graph 214 at time 3. Although only 3 historical graphs built/updated over three time periods, and three execution times, are shown in FIG. 2, it is contemplated that the periodic embedding, training, and predictions operations may go on for as many cycles are necessary or desired, in perpetuity. The cycle of updating a graph and re-embedding and training models may produce more accurate results as the graph data becomes more robust with each cycle.

In an exemplary aspect, the historical graphs in FIG. 2 may represent a bipartite graph of VCs and target companies. Peer group predictions may take the form of similar groups of target nodes and/or similar groups of VC nodes. Edge predictions may predict INVESTED_IN relationships that are directed edges that represent an investment from a VC node to a target node. Predictions from ML engine 252 may include target nodes that are likely to be funded in a given timeframe (e.g., target nodes that are ripe for funding in the next sixth months). The historical graphs may be updated with additional VC nodes, additional target nodes and additional INVESTED_IN edges.

In accordance with aspects, graph data can be loaded into a graph database and an API may be used in order to access the data. The modeling techniques discussed herein may access a graph database in order to access graph data therein, and may proceed with modeling techniques based on graph data retrieved from the graph database. Once the modeling techniques have been executed, the modeling engine(s) may store insights generated in the modeling engines in a high-performance database, such as an in-memory and/or no-SQL database. A database for housing insights generated through modeling and ML techniques is referred to herein as an insights database. An insights database built on a high-performance database engine or structure may allow for efficient retrieval of insights generated through modeling and ML techniques. Modeling and ML processes, as described herein, are generally not producible in real time. Accordingly, storing, and retrieving, insights in/from a high-performance database while querying relationship information directly from the graph (e.g., from a graph database) can allow for efficient access to both relationship data and modeled insights.

In accordance with aspects, in order to provide graphical details to users via a graphical user interface (GUI), a dual application programming interface may be provided along with a GUI that may make calls to both the graph database and the insights database. Relational information may be retrieved via graph queries on the graph database, while insight related data based on modeling and ML processing can be retrieved from an insights database. Such a dual querying mechanism carried out with two APIs for the different databases allows a complete picture of present relationships and potential relationships to be displayed in a single GUI. It additionally allows for ongoing modeling and ML processes in the background while current data is available for querying.

Figure 3:
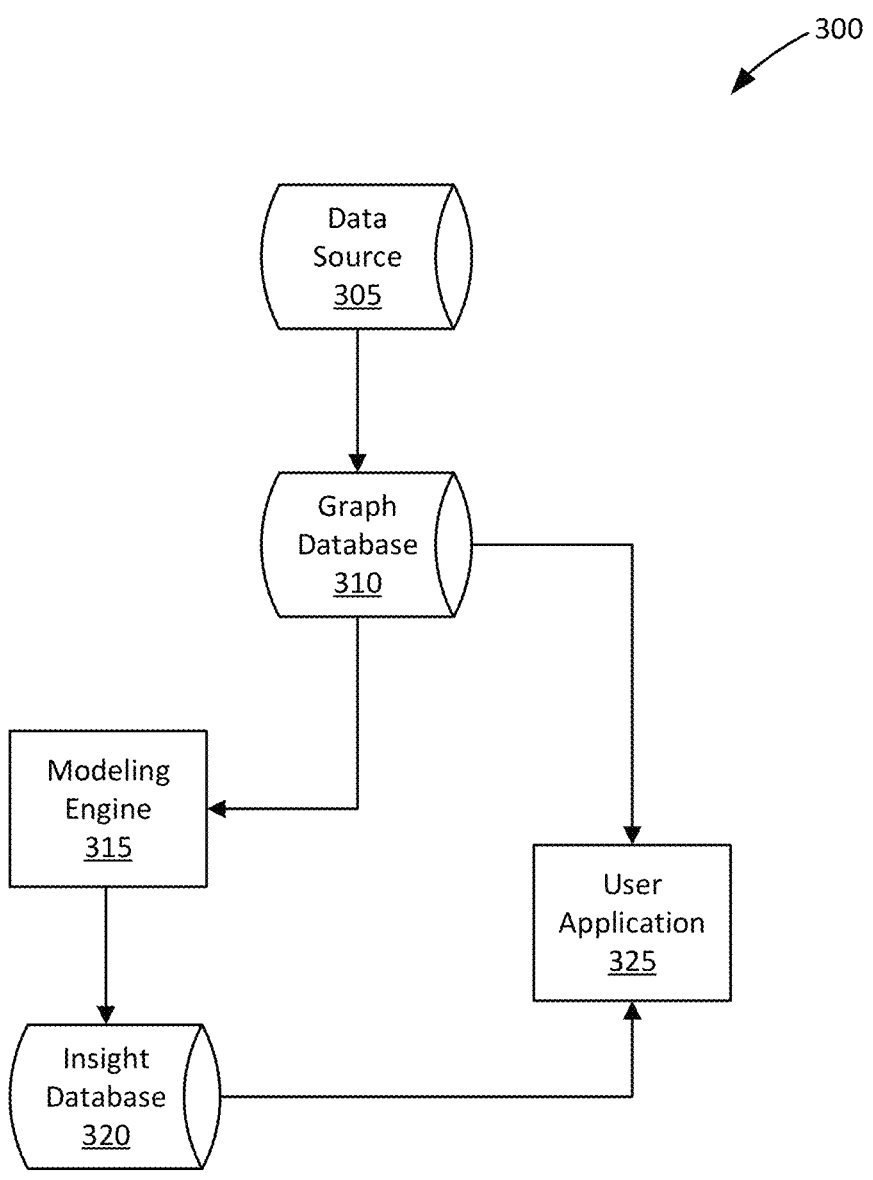
FIG. 3 is a block diagram of a system for accessing graph data, in accordance with aspects.

FIG. 3 is a block diagram of a system for accessing graph data, in accordance with aspects. System 300 includes data source 305 and graph database 310. System 300 further includes modeling engine 315, insight database 320, and user application 325. Graph database 310 may collect data from data source 305 and may store the information as graph structured data. Feature engineering may be performed on the data collected from data source 305 in order to identify attributes and format the attributes into a graph structure. That is, attributes may be identified as nodes or node attributes and/or edges and edge attributes and may be formatted for storage in graph database 310 as a graph. Graph database 310 may be a data store that is configured to store graphs as graph structured data and may further include any required hardware and database engine(s) necessary to execute and maintain a graph database. Data source 305 may be any internal or external data source from which relevant data can be collected and used to build a graph.

Modeling engine 315 may include one or more embedding models and/or ML models. For instance, modeling engine 315 may include an embedding model and a ML model as disclosed herein and may include necessary or desirable hardware with which to execute and maintain models associated therewith. Modeling engine 315 may be exposed to graph database 310 and graphs stored therein and may be configured to use graph data as input data for modeling and training processes and output insights based on predictions and peer groupings. Insight database 320 may store insights for retrieval. User application 325 may be an application configured with one or more API interfaces and a GUI. User application 325 may include an API interface for query graph database 310 and an API interface for querying insight database 320. An end user may utilize user application 325 in order to query both graph database 310 for graph relationships, and insight database 320 for insights. User application 325 may be configured to allow simultaneous queries to both graph database 310 and insight database 320 in order to return both node/relationship information, and insights with respect to nodes and relationships. User application 325 may display the results of the queries to end users of the application/graph in order to allow users to determine actionable information based on the queries.

Figure 4:
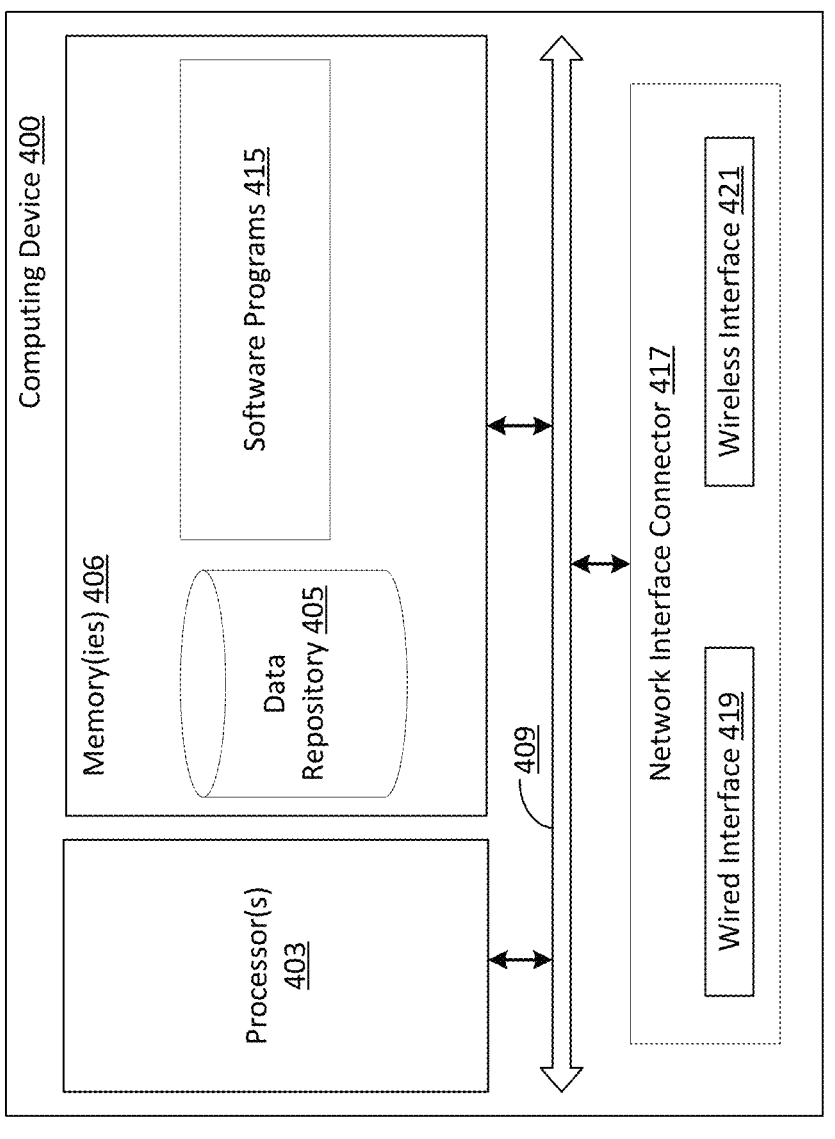
FIG. 4 is a block diagram of a computing device for implementing certain aspects of the present disclosure.

FIG. 4 is a block diagram of a computing device for implementing certain aspects of the present disclosure. FIG. 4 depicts exemplary computing device 400. Computing device 400 may represent hardware that executes the logic that drives the various system components described herein. For example, system components such as applications, event-driven functions, database servers, and computer applications may include, and/or execute on, components and configurations like, or similar to, computing device 400. Computing device 400 includes a processor 403 coupled to a memory 406. Memory 406 may include volatile memory and/or persistent memory. The processor 403 executes computer-executable program code stored in memory 406, such as software programs 415. Software programs 415 may include one or more of the logical steps disclosed herein as a programmatic instruction, which can be executed by processor 403. Memory 406 may also include data repository 405, which may be nonvolatile memory for data persistence. The processor 403 and the memory 406 may be coupled by a bus 409. In some examples, the bus 409 may also be coupled to one or more network interface connectors 417, such as wired network interface 419, and/or wireless network interface 421. Computing device 400 may also have user interface components, such as a screen for displaying graphical user interfaces and receiving input from the user, a mouse, a keyboard and/or other input/output components (not shown).

The various processing steps and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a micro-processor and/or in the form of statically or dynamically programmed electronic circuitry.

Hereinafter, general aspects of implementation of the systems and methods of the invention will be described.

The system of the invention or portions of the system of the invention may be in the form of a "processing machine" or a "computing device" such as a general-purpose computer, a computer server, a host machine, etc. As used herein, the term "processing machine" or "computing device" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software. In one aspect, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:
   embedding a graph with an embedding model, wherein the embedding generates node vectors and edge vectors for each node and each edge, respectively, in the graph, including performing dynamic embedding of the graph with periodic embedding of historical graphs generated over predefined time periods, wherein additional graph embedding is initialized with parameters from a previous embedding and tuned with newly added data of a most recently added historical graph, and wherein nodes that do not appear prior to addition of the most recent historical graph are initialized randomly;
   generating peer node groups based on the node vectors and the edge, wherein node type and edge direction are ignored for finding the peer nodes groups and a cosine similarity score is determined and the cosine similarity score being above a threshold is used for finding the peer node groups;
   generating edge predictions based on the node vectors and the edge vectors, wherein the edge predictions are further based on a distance between a head node and a tail node;
   training a machine learning model based on the node vectors and the edge vectors and node and edge attributes exposed to the machine learning model, wherein the machine learning model is a gradient-boosted decision tree model;
   inputting the node vectors and the edge vectors and the node and edge attributes into the machine learning model;
   receiving, as output from the machine learning model, a prediction of a future action based on the node vectors and the edge vectors and graph data including the node and edge attributes;
   generating a plurality of insights based on the peer node groups, the edge predictions, and the prediction of a future action;
   storing the plurality of insights in an insight database and the graph data in a graph database; and
   generating a graphical user interface including an interface to the graph database and the insight database, the graphical user interface configured to allow relational information to be retrieved via graph queries on the graph database and insight related data to be retrieved from the insight database.

2. The method of claim 1, wherein the peer node groups are based on inclusion in a predefined vector space.

3. A system comprising at least one computer wherein the at least one computer includes a processor, and wherein the at least one computer is configured to:
   embed a graph with an embedding model, wherein the embedding generates node vectors and edge vectors for each node and each edge, respectively, in the graph, including performing dynamic embedding of the graph with periodic embedding of historical graphs generated over predefined time periods, wherein additional graph embedding is initialized with parameters from a previous embedding and tuned with newly added data of a most recently added historical graph, and wherein nodes that do not appear prior to addition of the most recent historical graph are initialized randomly;

generate peer node groups based on the node vectors and the edge vectors, wherein node type and edge direction are ignored for finding the peer nodes groups and a cosine similarity score is determined and the cosine similarity score being above a threshold is used for finding the peer node groups;

generate edge predictions based on the node vectors and the edge vectors, wherein the edge predictions are further based on a distance between a head node and a tail node; train a machine learning model based on the node vectors and the edge vectors and node and edge attributes exposed to the machine learning model, wherein the machine learning model is a gradient-boosted decision tree model;

input the node vectors and the edge vectors into the machine learning model and the node and edge attributes;

receive, as output from the machine learning model, a prediction of a future action based on the node vectors and the edge vectors and graph data including the node and edge attributes;

generate a plurality of insights based on the peer node groups, the edge predictions, and the prediction of a future action;

store the plurality of insights in an insight database and the graph data in a graph database; and generate a graphical user interface including an interface to the graph database and the insight database, the graphical user interface configured to allow relational information to be retrieved via graph queries on the graph database and insight related data to be retrieved from the insight database.

4. The system of claim 3, wherein the peer node groups are based on inclusion in a predefined vector space.

5. A non-transitory computer readable storage medium, including instructions stored thereon, which instructions, when read and executed by one or more computer processors, cause the one or more computer processors to perform steps comprising:

embedding a graph with an embedding model, wherein the embedding generates node vectors and edge vectors for each node and each edge, respectively, in the graph, including performing dynamic embedding of the graph with periodic embedding of historical graphs generated over predefined time periods, wherein additional graph embedding is initialized with parameters from a previous embedding and tuned with newly added data of a most recently added historical graph, and wherein nodes that do not appear prior to addition of the most recent historical graph are initialized randomly;

generating peer node groups based on the node vectors and the edge vectors, wherein node type and edge direction are ignored for finding the peer nodes groups and a cosine similarity score is determined and the cosine similarity score being above a threshold is used for finding the peer node groups;

generating edge predictions based on the node vectors and the edge vectors, wherein the edge predictions are further based on a distance between a head node and a tail node;

training a machine learning model based on the node vectors and the edge vectors and node and edge attributes exposed to the machine learning model, wherein the machine learning model is a gradient-boosted decision tree model;

inputting the node vectors and the edge vectors into the machine learning model and the node and edge attributes;

receiving, as output from the machine learning model, a prediction of a future action based on the node vectors and the edge vectors and graph data including the node and edge attributes;

generating a plurality of insights based on the peer node groups, the edge predictions, and the prediction of a future action;

storing the plurality of insights in an insight database and the graph data in a graph database; and generating a graphical user interface including an interface to the graph database and the insight database, the graphical user interface configured to allow relational information to be retrieved via graph queries on the graph database and insight related data to be retrieved from the insight database.

6. The non-transitory computer readable storage medium of claim 5, wherein the peer node groups are based on inclusion in a predefined vector space.

* * * * *